(12) United States Patent
Sprouse et al.

(10) Patent No.: US 7,547,423 B2
(45) Date of Patent: Jun. 16, 2009

(54) COMPACT HIGH EFFICIENCY GASIFIER

(75) Inventors: Kenneth M Sprouse, Northridge, CA (US); Shahram Farhangi, Woodland Hills, CA (US); David R Matthews, Simi Valley, CA (US)

(73) Assignee: Pratt & Whitney Rocketdyne, Canoga Park, CA (US)

( * ) Notice: Subject to any disclaimer, the term of this patent is extended or adjusted under 35 U.S.C. 154(b) by 538 days.

(21) Appl. No.: 11/081,144

(22) Filed: Mar. 16, 2005

(65) Prior Publication Data
US 2006/0210457 A1    Sep. 21, 2006

(51) Int. Cl.
*B01J 19/00* (2006.01)
(52) U.S. Cl. .................. 422/198; 165/134.1; 48/62 R
(58) Field of Classification Search .......... 48/61–127.9; 422/198; 165/95, 134.1
See application file for complete search history.

(56) References Cited

U.S. PATENT DOCUMENTS

| | | | |
|---|---|---|---|
| 3,856,658 A | 12/1974 | Wolk et al. | |
| 3,954,389 A | 5/1976 | Szetela | |
| 4,188,915 A | * 2/1980 | Kummel et al. | ............. 122/6 A |
| 4,191,500 A | 3/1980 | Oberg et al. | |
| 4,197,092 A | 4/1980 | Bretz | |
| 4,206,610 A | 6/1980 | Santhanam | |
| 4,356,078 A | 10/1982 | Heavin et al. | |
| 4,362,500 A | 12/1982 | Eriksson et al. | |
| 4,377,356 A | 3/1983 | Santhanam | |
| 4,391,561 A | 7/1983 | Smith et al. | |

(Continued)

FOREIGN PATENT DOCUMENTS

DE     32 19 190     11/1983

(Continued)

OTHER PUBLICATIONS

Pending U.S. Appl. No. 09/954,753, filed Sep. 2001, Marshall et al.

(Continued)

*Primary Examiner*—Alexa D Neckel
*Assistant Examiner*—Imran Akram
(74) *Attorney, Agent, or Firm*—Carlson, Gaskey & Olds PC (57) ABSTRACT

A gasifier system is provided that includes a gasification chamber spool that has a ceramic matrix composite (CMC) liner adapted to form a solidified slag protective layer on an interior surface of the liner from molten slag flowing through the gasification chamber spool. The gasification system additionally includes a heat exchanger (HEX) quench spool that also includes a CMC liner adapted to form a solidified slag protective layer on an interior surface of the liner from molten slag flowing through the HEX quench spool. Additionally, the HEX quench spool includes a parallel plate HEX core having a plurality of CMC panels. The CMC panels are adapted to form a solidified slag protective layer on exterior surfaces of each respective CMC panel from molten slag flowing through the HEX quench spool. Furthermore, each CMC panel includes a plurality of internal coolant channels adapted to exchange sensible waste heat from the hot product flowing through the HEX quench spool with a coolant flowing through the internal coolant channels. The sensible waste heat absorbed by the coolant is recovered by the gasification system by utilizing the heated coolant in various operational phases of the gasification system.

19 Claims, 8 Drawing Sheets

U.S. PATENT DOCUMENTS

| | | | |
|---|---|---|---|
| 4,488,838 A | 12/1984 | Herud | |
| 4,525,176 A | 6/1985 | Koog et al. | |
| 4,721,420 A | 1/1988 | Santhanam et al. | |
| 4,818,253 A | 4/1989 | Kohnen et al. | |
| 5,458,859 A | 10/1995 | Vollhardt et al. | |
| 5,558,473 A | 9/1996 | Lindahl | |
| 5,968,212 A | 10/1999 | Peise et al. | |
| 5,976,203 A | 11/1999 | Deeke et al. | |
| 6,152,668 A | 11/2000 | Knoch | |
| 6,220,790 B1 | 4/2001 | Schenk et al. | |
| 6,418,973 B1 * | 7/2002 | Cox et al. | 139/383 R |

FOREIGN PATENT DOCUMENTS

| | | |
|---|---|---|
| EP | 0 254 830 | 2/1988 |
| EP | 0 435 424 | 7/1991 |
| EP | 0 606 773 | 7/1994 |
| GB | 2073386 | 10/1981 |
| WO | WO 00/01787 | 1/2000 |

OTHER PUBLICATIONS

Pending U.S. Appl. No. 10/271,950, filed Oct. 2002, Sprouse et al.
Pending U.S. Appl. No. 10/677,817, filed Oct. 2003, Sprouse.
Pending U.S. Appl. No. 10/931,061, filed Aug. 2004, Sprouse.
K. M. Sprouse and M.D. Schuman, Dense-Phase Feeding of Pulverized Coal in Uniform Plug Flow, Nov. 1983, pp. 1000-1006 and reference page.

* cited by examiner

FIG. 1

| IDENTIFICATION | SLURRY FEED | OXYGEN FEED | STEAM FEED | LINER COOLANT IN | LINER COOLANT OUT | HOT PRODUCT | HEX QUENCH PRODUCT | HEX BFW | HIGH PRESSURE STEAM | DELUGE WATER RECYCLE | DELUGE QUENCH PRODUCT |
|---|---|---|---|---|---|---|---|---|---|---|---|
| FLOW RATE (lbm/sec) | 73.6 | 53.5 | 13.9 | 6.32 | 6.32 | 141.0 | 141.0 | 50.4 | 36.5 | 132 | 273 |
| TEMPERATURE (F) | 195 | 700 | 700 | 600 | 1200 | 2570 | 750 | 100 | 1200 | 150 | 300 |
| PRESSURE (psig) | 1200 | 1200 | 1200 | 1200 | 1200 | 1000 | 1000 | 1300 | 1200 | 1300 | 1000 |
| COMPOSITIONS | | | | | | | | | | | |
| COAL - ILLINOIS #6 (wt%) | 94.43 | | | | | | | | | | |
| PROXIMATE ANALYSIS | | | | | | | | | | | |
| MOISTURE (wt%) | 2.00 | | | | | | | | | | |
| ASH (wt%) | 10.69 | | | | | | | | | | |
| VOLATILES (wt%) | 38.58 | | | | | | | | | | |
| FIXED CARBON (wt%) | 48.73 | | | | | | | | | | |
| ULTIMATE ANALYSIS | | | | | | | | | | | |
| MOISTURE (wt%) | 2.00 | | | | | | | | | | |
| CARBON (wt%) | 70.29 | | | | | | | | | | |
| HYDROGEN (wt%) | 4.96 | | | | | | | | | | |
| NITROGEN (wt%) | 1.38 | | | | | | | | | | |
| CHLORINE (wt%) | 0.32 | | | | | | | | | | |
| SULFUR (wt%) | 2.76 | | | | | | | | | | |
| OXYGEN (wt%) | 7.60 | | | | | | | | | | |
| ASH (wt%) | 10.69 | | | | | | | | | | |
| HIGHER HEATING VALUE (Btu/lbm) | 12,860 | | | | | | | | | | |
| PARTICLE SIZE DISTRIBUTION | | | | | | | | | | | |
| wt% THRU 20 MESH (841 μm) | 99 | | | | | | | | | | |
| wt% THRU 80 MESH (177 μm) | 90 | | | | | | | | | | |
| wt% THRU 140 MESH (105 μm) | 80 | | | | | | | | | | |
| wt% THRU 200 MESH (74 μm) | 70 | | | | | | | | | | |
| CARBON DIOXIDE (wt%) | 5.57 | | | | | | | | | | |
| OXYGEN (wt%) | | 95.60 | | | | | | | | | |
| NITROGEN (wt%) | | 4.40 | | | | | | | | | |
| STEAM (wt%) | | | 100.0 | 100.0 | 100.0 | | | 100.0 | 100.0 | 100.0 | |
| WATER (wt%) | | | | | | | | | | | |
| MOLTEN SLAG (wt%) | | | | | | 5.27 | 5.27 | | | | |
| FLY ASH (wt%) | | | | | | 94.73 | 94.73 | | | | |
| SYNTHESIS GAS (wt%) | | | | | | | | | | | 47.03 |
| | | | | | | | | | | | 2.72 |
| | | | | | | | | | | | 50.25 |
| COMPOSITION | | | | | | | | | | | |
| CH4 (vol%) | | | | | | 0.03 | 0.03 | | | | 0.02 |
| CO (vol%) | | | | | | 58.32 | 58.32 | | | | 56.65 |
| CO2 (vol%) | | | | | | 2.14 | 2.14 | | | | 2.08 |
| COS (vol%) | | | | | | 0.06 | 0.06 | | | | 0.06 |
| HCN (ppm) | | | | | | <100 | <100 | | | | <100 |
| HCL (vol%) | | | | | | 0.09 | 0.09 | | | | 0.09 |
| H2O (vol%) | | | | | | 32.35 | 32.35 | | | | 31.39 |
| H2S (vol%) | | | | | | 0.87 | 0.87 | | | | 0.85 |
| NH3 (vol%) | | | | | | 1.00 | 1.00 | | | | 0.97 |
| N2 (vol%) | | | | | | 1.22 | 1.22 | | | | 1.19 |

COMPACT HIGH EFFICIENCY GASIFIER

FIELD OF INVENTION

The invention relates generally to gasifiers for converting a coal precursor, such as coal or petcock, into a synthetic gas. More particularly, the invention relates to a compact, highly efficient single stage gasifier.

BACKGROUND OF THE INVENTION

Electricity and electrically powered systems are becoming ubiquitous and it is becoming increasingly desirable to find sources of power. For example, various systems may convert various petrochemical compounds, such as coal and petcoke, into electrical energy. Further, such petrochemical compounds are used to create various other materials such as steam that are used to drive steam powered turbines.

The gasification of coal and petcoke to synthesis gas (syngas), e.g. mixtures of hydrogen and carbon monoxide, is a well-known industrial process used in the petrochemical and gas power turbine industries. Over the last 20 years, the use of entrained flow coal gasifiers has become a very common process in the production of synthesis gas. However, these entrained flow gasifiers fail to make use of rapid mix injector technology with regeneratively cooled hardware. The failure to use such technologies causes gasifier volumes and capital costs to be much higher than necessary, and gasifier thermal efficiencies, i.e. cold gas efficiencies (CGE), to be much lower than theoretically possible. Lowering the overall gasification capital costs and raising the CGE of gasification system are very desirable.

BRIEF SUMMARY OF THE INVENTION

In one preferred embodiment, the present invention provides a compact, highly efficient gasifier system for converting a carbonaceous material into a gaseous product. The gasifier system includes a gasification chamber spool that has a ceramic matrix composite (CMC) liner effectively 'free floating' within the gasification chamber spool. The CMC liner is adapted to form a solidified slag protective layer on an interior surface of the liner from molten slag flowing through the gasification chamber spool. The gasifier system additionally includes a convergent spool coupled to the gasification chamber spool that also includes a CMC liner adapted to form a solidified slag protective layer on an interior surface of the liner from molten slag flowing through the convergent spool.

The gasification system further includes a heat exchanger (HEX) quench spool coupled to the convergent spool that also includes a CMC liner adapted to form a solidified slag protective layer on an interior surface of the liner from molten slag flowing through the HEX quench spool. Additionally, the HEX quench spool includes a parallel plate HEX core having a plurality of CMC panels. The CMC panels are adapted to form a solidified slag protective layer on exterior surfaces of each respective CMC panel from molten slag flowing through the HEX quench spool. Furthermore, each CMC panel includes a plurality of internal coolant channels adapted to exchange sensible waste heat from the hot product flowing through the HEX quench spool with a coolant flowing through the internal coolant channels. The sensible waste heat absorbed by the coolant is recovered by the gasification system by utilizing the heated coolant in various operational phases of the gasification system.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
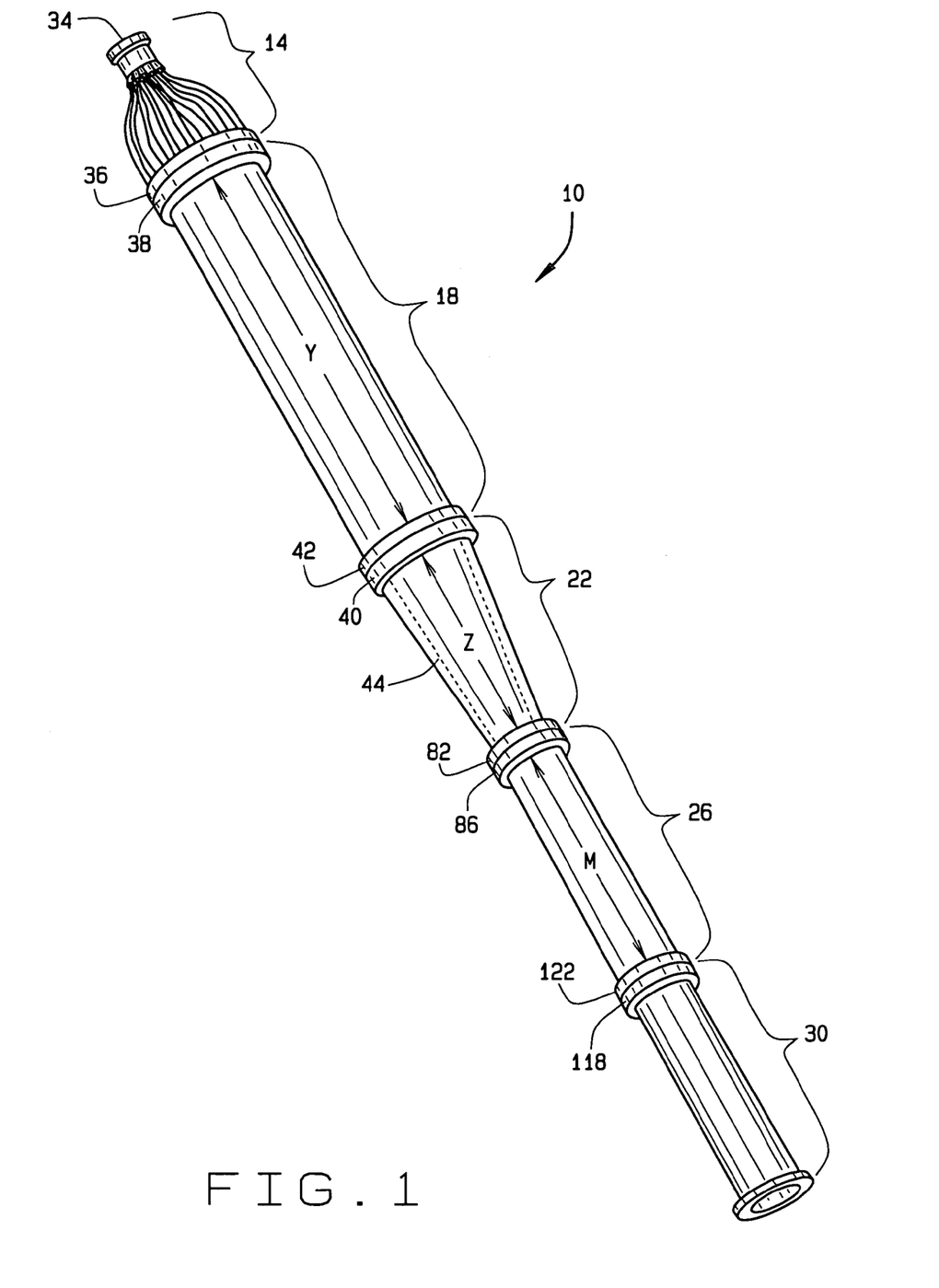
FIG. 1 is an illustration of a gasifier system in accordance with one preferred embodiment of the present invention.

FIG. 1 is an illustration of a compact, highly efficient single stage gasifier system 10 capable of producing a syngas from a carbonaceous material such as coal or petcoke with a cold gas efficiency (CGE) greater than 80%, in accordance with one preferred embodiment of the present invention. The gasifier system 10 includes an injector spool 14 coupled to a gasification chamber spool 18 that is coupled to a convergent spool 22. The convergent spool 22 is coupled to a heat exchanger (HEX) quench spool 26. In one preferred embodiment, the HEX quench spool 26 is coupled to a deluge quench spool 30. The injector spool 14 can be any suitable injector adapted to mix a carbonaceous material, such as coal or petcoke, with a dry slurry medium, such as carbon dioxide $CO_2$ or a synthesis gas, for example, a mixture of hydrogen and CO, to form a substantially dry or water free slurry that is injected into the gasification chamber spool 18. The injector spool 14 also injects other reactants, such as oxygen and steam, into the gasification chamber spool 18, such that the other reactants impinge on the dry slurry causing a reaction that produces high energy content synthesis gas, for example, hydrogen and carbon monoxide.

The design of the gasifier system 10, as described herein, enables the gasifier system 10 to be much more efficient than known gasifier systems. More particularly, the compact design, use of a dry slurry medium, e.g. $CO_2$, and use of ceramic matrix composite (CMC) structures of the gasifier system 10, e.g. CMC liners and a CMC parallel plate HEX core, gasifies the dry slurry using considerably less oxygen with considerably reduced heat losses, i.e. a higher chemical energy efficiency (CEE), than known gasifier systems. Therefore, by requiring less oxygen and having a very high CEE, the gasifier system 10 generates the syngas with a much higher CGE than known gasifier systems. For example, the gasifier system 10 has a CGE of greater than 80%, for example 83% to 90% or greater. The CMC utilized to form the liners, HEX core and other structures of the gasifier system 10 is described in U.S. Pat. No. 6,418,973, issued Jul. 16, 2002, titled "INTEGRALLY WOVEN CERAMIC COMPOSITES", assigned to The Boeing Company, and incorporated herein by reference. Additionally, the compact design, use of the rapid mix injector spool 14, use of a dry slurry medium and use of ceramic matrix composite (CMC) structures of the gasification system 10 produces the syngas with residence times of the dry slurry and reactants within the gasification chamber spool 18 of approximately 0.50 seconds or less, for example approximately 0.20.

Figure 2:
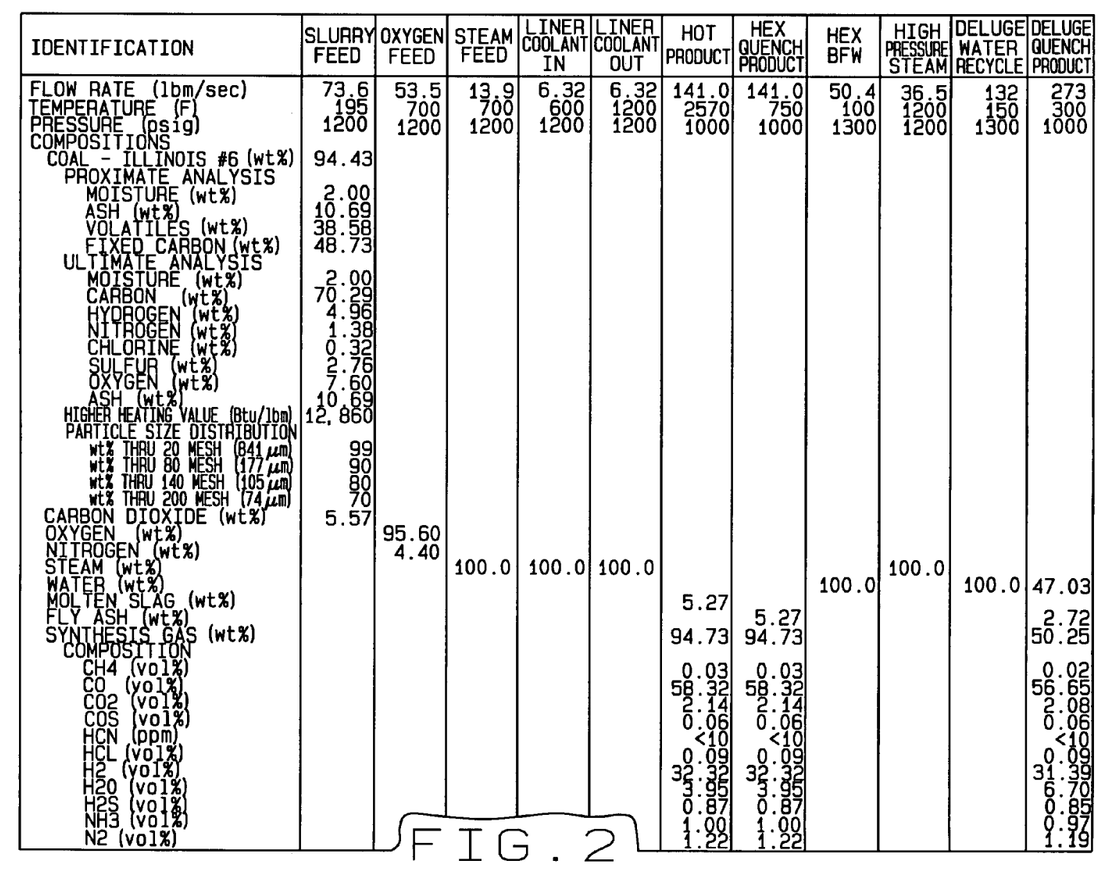
FIG. 2 is an illustration of an exemplary mass/energy balance table for the gasifier system shown in FIG. 1.

FIG. 2 is a table illustrating mass/energy balance numbers of the material input to the gasification system 10 and the materials and their physical properties produced by the gasification system 10, in accordance with an exemplary embodiment of the present invention. In an exemplary embodiment, the injector spool 14 is capable of receiving 73.6 lbm/sec of CO2/Coal slurry through a 6 inch schedule-40 pipe inlet flange. FIG. 2 exemplarily shows that a 195° F. slurry feed stream injected into the gasification chamber spool 18 contains 5.57 wt % carbon dioxide gas as the slurry transport fluid. This feed stream is delivered from a high pressure slurry pump system such as described in U.S. patent application Ser. No. 10/271,950, filed Oct. 15, 2002, titled "METHOD AND APPARATUS FOR CONTINUOUSLY FEEDING AND PRESSURIZING A SOLID MATERIAL INTO A HIGH PRESSURE SYSTEM", incorporated herein by reference. In accordance with the exemplary embodiment illustrated in FIG. 2, in addition to the dry coal slurry, the injector spool 14 also receives a mixture of 53.5 lbm/sec oxygen and 13.9 lbm/sec steam at 1200 psia and 700 F. In one embodiment, an inside diameter X, shown in FIG. 4, of the injector spool 14, at the junction where the injector spool 14 couples with the gasification chamber spool is approximately 35 to 45 inches, for example, approximately 39 inches.

Figure 3:
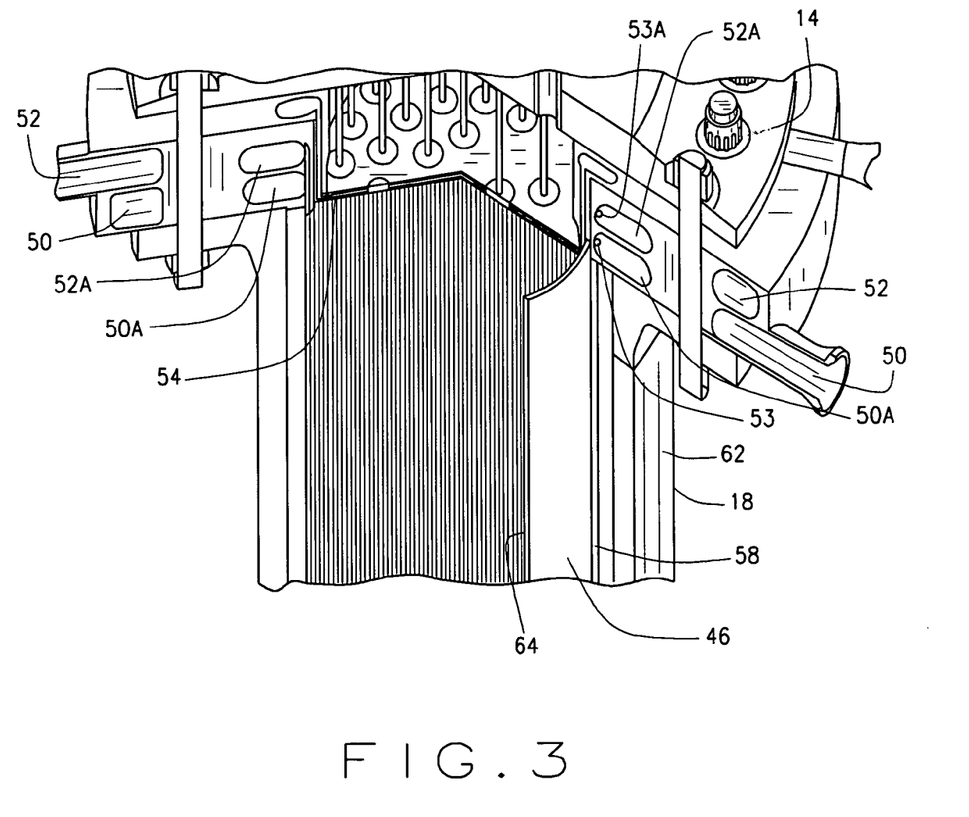
FIG. 3 is a cut-a-way view of a portion of a gasification chamber spool included in the gasifier system shown in FIG. 1, in accordance with one embodiment of the present invention.

Referring to FIGS. 1 and 3, the gasification chamber spool 18 mates with and couples to a lower end flange 36 of the injector spool 14 at an upper end flange 38 and to an upper end flange 40 of the convergent spool 22 at a lower end flange 42.

The gasification chamber spool 18 has an inside diameter that effectively matches the inside diameter X of the injector spool 14. For example, in one implementation, the inside diameter of the gasification chamber spool 18 is between approximately 25 inches and 45 inches, e.g. approximately 39 inches and a length Y of the gasification chamber spool 18 is between approximately 10 feet and 20 feet, e.g. approximately 15 feet.

The gasifier chamber spool 18 includes a liner 46. In one preferred embodiment, the liner 46 is a regeneratively cooled CMC liner including cooling channels such as that described in U.S. patent application Ser. No. 10/677,817, filed Oct. 2, 2003, titled "REGENERATIVELY COOLED SYNTHESIS GAS GENERATOR", incorporated herein by reference. In a preferred implementation, the CMC liner 46 has a dual-pass cooling design with an inlet coolant ring manifold 50 and an exit coolant ring manifold 52, shown in FIG. 3, included in the upper end flange 38 of the gasification chamber spool 18 that supply and output a coolant to and from the cooling channels of the CMC liner 46. In another embodiment, the CMC liner 46 has a single up-pass cooling design with the inlet coolant ring manifold 50 included in the upper end flange 38 of the gasification chamber spool 18 that supplies a coolant to the cooling channels of the CMC liner 46 and the exit coolant ring manifold 52 included the lower end flange 42 of the gasification chamber spool 18.

Referring to FIG. 3, the coolant is supplied to the inlet ring manifold 50 and flows radially inward to an inner annular portion 50A of the inlet ring manifold 50. The inner annular portion 52A includes a plurality of silicon nitride ($Si_3N_4$) nipples 53 that connect to and allow the coolant to flow into one half of the cooling channels of the CMC liner 46. The coolant is retuned through the one half of the cooling channel to an inner annular portion 52A of the exit ring manifold 52, via a plurality of silicon nitride nipples 53A. The coolant then flow radially outward and exits the gasifier chamber spool upper end flange 30 through the exit ring manifold 52. The silicon nitride nipples and their implementation to provide coolant to the CMC liner 46 is described in detail in U.S. Pat. No. 6,758,386, issued Jul. 6, 2004, titled "Method of joining ceramic matrix composites and metals", assigned to The Boeing Company, which is incorporated herein by reference.

The manifold joints in the upper end flange 38 of the gasification chamber spool 18 are protected by a face 54, best shown in FIG. 4, of the injector spool 14 that protrudes below the joint between the injector spool end flange 36 and the gasification chamber spool upper end flange 38. This will shield the upper manifold(s), e.g. inlet manifold 50, from the hot gasification environment near the face 54 of the injector spool 14, which can exceed 4000° F. The mass/energy table shown in FIG. 2 illustrates that in one exemplary embodiment the desired CMC liner 46 coolant that flows through the CMC liner cooling channels is saturated steam. The saturated steam is provided via inlet manifold 50 at approximately 600° F. provided, at a high pressure of approximately 1,200 psia with a flow rate of approximately 6.32 lbm/sec. As the saturated steam flows through the CMC liner 46 absorbing heat generated by the gasification reaction occurring within the gasification chamber spool 18, the saturated steam will become superheated to about 1,200° F. The superheated steam that exits the gasification chamber spool 18, via the exit manifold 52, can subsequently be mixed with the 13.9 lbm/sec steam and 53.5 lbm/sec oxygen reactants to produce a mix temperature of 700° F. that is then impinged on the dry slurry injected into the gasification chamber spool 18. Preferably, a layer of insulation 58, such as air, is located between the gasification chamber spool 18 CMC liner 46 and an outer housing 62 of the gasification chamber spool 18. Based on the exemplary temperature of the superheated steam of approximately 1200° F., the insulation 58 will maintain the housing 62 below approximately 1,000° F. during operation of the gasification system 10.

The hot product, i.e. slag and syngas, created by the gasification of the dry slurry, can reach temperatures between approximately 2100° F. and 2900° F. The saturated steam flowing through the CMC liner 46 will exemplarily maintain the CMC liner 46 at approximately 1700° F. Therefore, any molten slag flowing through the gasification chamber spool 18 at approximately between 2100° F. and 2900° F. that strikes an interior surface 64 the CMC liner 46 will solidify and adhere to the interior surface 64 of the approximately 1700° F. CMC liner 46 to create a protective layer on the CMC liner 46. The protective solidified slag layer will prevent other solidified slag particles from damaging the CMC liner 46. The protective solidified slag layer will have a temperature of about 2400° F. at a surface slag layer exposed to the hot product and about 1700° F. at a surface of the slag layer adhered to the CMC liner 46. As solidified slag particles strike the protective slag layer, the slag layer will deteriorate, but other molten slag will quickly solidify on the protective slag layer to repair any such deterioration.

In an alternative embodiment, the liner 46 is a metal liner having metal cooling tubes or channels. To prevent significant chemical corrosion of the metal liner 46, the coolant flowing through the cooling tubes or channels must be maintained below 700° F. Therefore, the coolant, e.g. water, supplied to the metal liner cooling tubes can only be water or saturated steam at about 400° F. and can not become superheated steam as it flows through the cooling tubes or channels.

Figure 4:
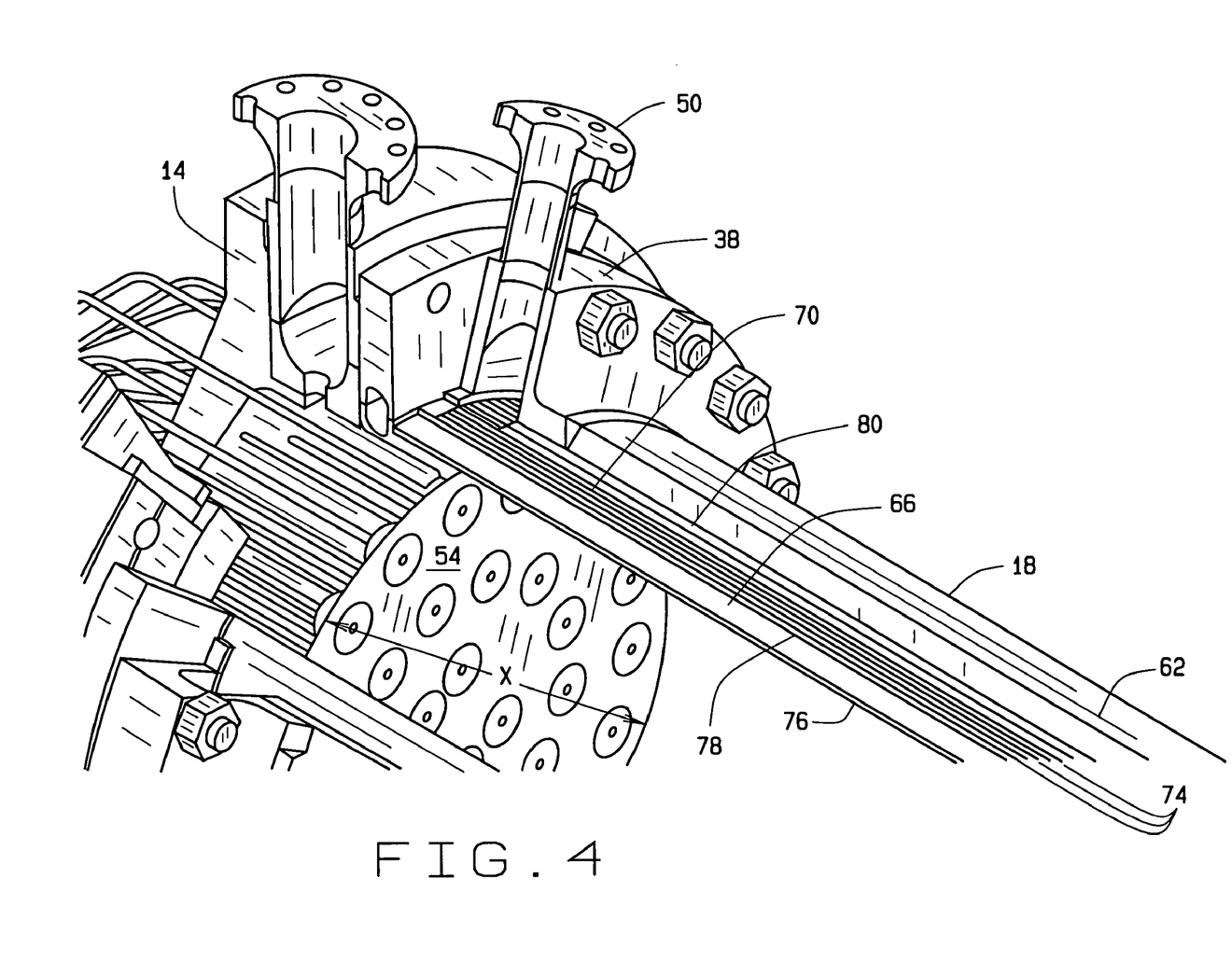
FIG. 4 is a cut-a-way view of a portion of a gasification chamber spool included in the gasifier system shown in FIG. 1, in accordance with another embodiment of the present invention.

Referring to FIG. 4, in an alternate preferred embodiment, the gasification chamber spool 18 includes a liner 66 without cooling channels. In one embodiment the liner 66 is a fiberous CMC liner 66. Preferably, the CMC liner 66 is a single CMC cylinder that is about ⅛ to ½ inch thick, for example ¼ inch thick that is attached to the upper end flange 38 and the lower end flange 42 such that the CMC liner 66 is effectively 'free floating' within the gasification chamber spool housing 18. Additionally, in this embodiment, the gasification chamber spool 18 includes a secondary liner 70 than includes a plurality of cooling channels 74. The secondary liner 70 can be constructed of any suitable metal, material or composite that will not rust and can withstand elevated temperature, for example stainless steel. It is envisioned that the secondary liner 70 will be about 1/16 to ¼ inches thick, for example ⅛ inch thick. The secondary liner 70 is attached or brazed to the housing 18 and an insulation barrier 78 is provided between the CMC liner 66 and the secondary liner 70.

The insulation barrier 78 can be any suitable substance, material or composite that will provide a sufficient temperature differential between the CMC liner 66 and the secondary liner 70 such that the CMC liner 66 and the secondary liner 70 are respectively maintained at suitable temperatures. That is, the insulation barrier should be suitable to maintain the CMC liner 66 at a temperature adequate to solidify molten slag flowing within the gasification chamber spool 18 and allow the coolant flowing through the cooling channels 74 to maintain the secondary liner 70 at a temperature that will not cause damage to the secondary liner 70. For example, the insulation barrier 78 can be an air gap approximately 1/16 to ½ inch wide between the CMC liner 66 and the secondary liner 70. In a preferred implementation of this embodiment, the gasification chamber spool 18 additionally includes a close-out sheet 80 between the secondary liner 70 and the gasification chamber spool housing 62. The close out sheet 80 is attached or brazed to the housing 18 and the secondary liner 70. The close out sheet 80 can be any metal, material or composite suitable to further protect the housing 18 from damage due to the high temperature produced within the gasification chamber spool 18, for example stainless steel. Preferably, the close out sheet is approximately 0.125 inches to 0.350 inches thick.

In the exemplary embodiment illustrated in FIG. 2, the gasification of the dry slurry will cause the CMC liner to reach a temperature of about 1700° F. Thus, if there were not an insulation barrier 78 and the CMC liner 66 contacted secondary liner 70, the coolant flowing through the cooling channels 74, for example water ($H_2O$), would conduct too much heat and cause the secondary liner 70 to reach temperatures above 800° F. with detrimental corrosion reactions, such as sulfidation, to occur. In one implementation, the insulation barrier 78 will provide greater than a 1000° F. differential between the CMC liner 66 and the secondary liner 70.

For example, if the coolant flowing through the cooling channels 74, e.g. water, is supplied at approximately 400° F. such that the temperature of the secondary liner 70 is maintained at approximately 600° F., and the CMC liner 66 is maintained at a temperature of approximately 1700° F., as illustrated in the table of FIG. 2, the insulation barrier 78 provides an 1100° F. temperature differential between the CMC liner side and the secondary liner side of the insulation barrier 78.

The hot product, i.e. slag and syngas, created by the gasification of the dry slurry, can reach temperatures between approximately 2100° F. and 2900° F. The insulation barrier 78 and the secondary liner 70 with 400° F. coolant flowing through the cooling channels 74 will exemplarily maintain the CMC liner 66 at approximately 1700° F. Therefore, any molten slag flowing through the gasification chamber spool 18 at approximately between 2100° F. and 2900° F. that strikes an interior surface 76 the CMC liner 66 will solidify and adhere to the interior surface 76 of the approximately 1700° F. CMC liner 66 to create a protective layer on the CMC liner 66. The protective solidified slag layer will prevent other solidified slag particles from damaging the CMC liner 66. The protective solidified slag layer will have a temperature of about 2400° F. at a surface of the slag layer exposed to the hot product and about 1700° F. at a surface of the slag layer adhered to the CMC liner 66. As solidified slag particles strike the protective slag layer, the slag layer will deteriorate, but other molten slag will quickly solidify on the protective slag layer to repair any such deterioration.

In an alternative embodiment, the liner 66 is a metal liner having metal cooling tubes or channels. To prevent significant chemical corrosion of the metal liner 66, the coolant flowing through the cooling tubes or channels must be maintained below 700° F. Therefore, the coolant, e.g. water, supplied to the metal liner cooling tubes can only be water or saturated steam at about 400° F. and can not become superheated steam as it flows through the cooling tubes or channels.

Figure 5A:
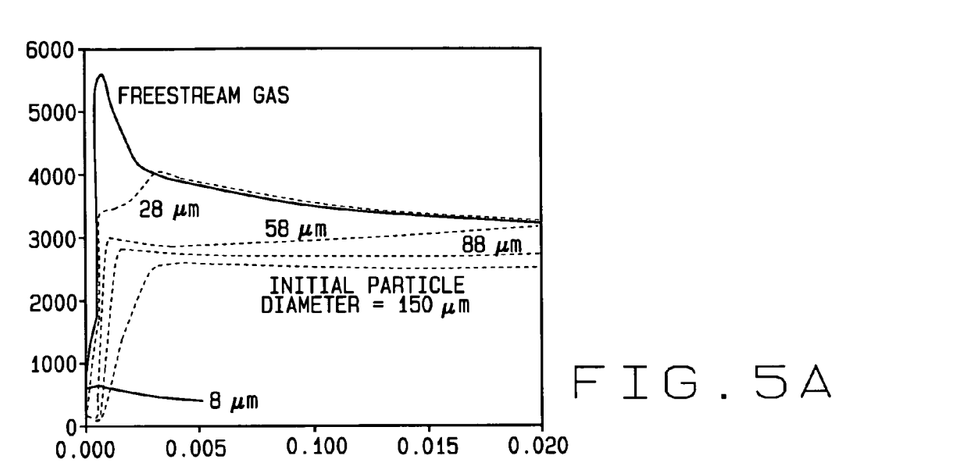
FIG. 5A is a graph illustrating a temperature profile of syngas produced within the gasification chamber spool for approximately 0.02 seconds of a residence time of the syngas within the gasification chamber spool, in accordance with the exemplary embodiment of the present invention illustrated in FIG. 2.
Figure 5B:
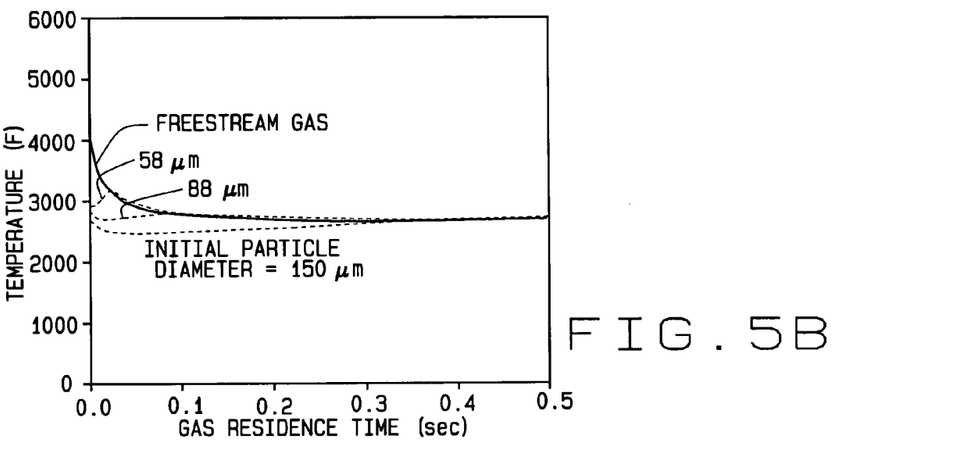
FIG. 5B is a graph illustrating a temperature profile of the syngas the gasification chamber spool for approximately 0.5 seconds of the residence time of the syngas within the gasification chamber spool, in accordance with the exemplary embodiment of the present invention illustrated in FIG. 2.
Figure 5C:
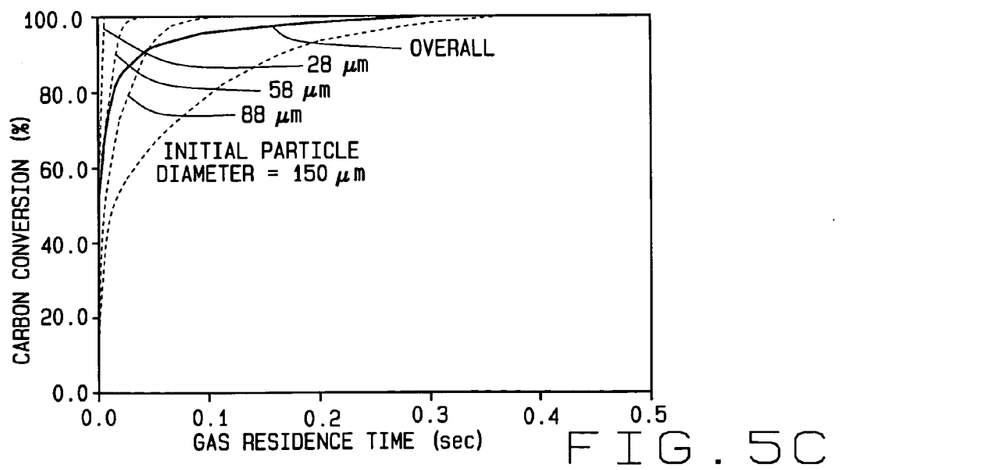
FIG. 5C is a graph illustrating a carbon conversion of a carbonaceous material injected into the gasification chamber spool versus the residence time of the carbonaceous material within the gasification chamber spool, in accordance with the exemplary embodiment of the present invention illustrated in FIG. 2.

Referring to FIGS. 5A, 5B and 5C, as described herein, the compact gasifier system 10 uses a dry slurry medium, e.g. $CO_2$, to produce a dry slurry that is injected into the gasification chamber spool 18 by the rapid mix injector spool 14. Additionally, the injector spool 14 has a low steam-to-dry carbonaceous material ratio, e.g. approximately 0.2 lbm/lbm. Therefore, the liner 46 and 66 of the gasification chamber spool must be capable of withstanding relatively high forward end gas temperatures at 1,000 psia chamber pressures. FIGS. 5A through 5C show syngas/particle temperature profiles, together with particle and overall carbon conversions, of the gasification chamber spool 18, as a function of syngas/particle flight time from the injector spool 14, i.e. residence time within the gasification chamber spool 18. It should be noted that the 0.5 sec residence time corresponds to the length Y of gasification chamber spool 18 being 15 feet as utilized in the exemplary embodiment illustrated in the table of FIG. 2. FIG. 5A, illustrates that a forward end gas temperature can exemplarily approach approximately 5,800° F. The advantages of having high forward end gas temperatures is that the rapid reaction times produced by the gasification chamber spool 18 lower a total residence time of the resulting syngas/particles by at least an order of magnitude from known gasifier system and achieve effectively 100% overall carbon conversions.

More particularly, as exemplarily shown in FIG. 2, oxygen and steam are injected into the gasification chamber spool 18 and impinge the dry slurry at about 700° F. Upon impinging the dry slurry, the resulting chemical reaction will generate temperatures of approximately 5000° F. or higher. The temperature of the resulting syngas/particles, referred to as hot product, e.g. hydrogen ($H_2$), carbon monoxide (CO) and the other substances shown in FIG. 2, will start dropping as the hot product moves along the length Y of the gasification chamber spool 18. As illustrated in FIG. 5B the temperatures of the hot product reach a temperature of approximately 2600° F. to 2700° F. by the time the hot product exits the gasifier after approximately ½ second of resonance time. Referring to FIG. 2, 53.5 lbm/sec of oxygen and 13.9 lbm/sec of steam are mixed and impinged on 73.6 lbm/sec of dry slurry injected into the gasification chamber spool 18. The resulting chemical reaction produces the hot product at about 141.0 lbm/sec, 1000 psia and having the temperature profiles shown in FIGS. 5A and 5B. As exemplarily illustrated in FIG. 2, 5.3% of the hot product stream is molten slag; and the other 94.7% is this synthesis gas comprising the substances shown in FIG. 2, e.g. methane, carbon monoxide, ammonia, nitrogen, etc.

Referring again to FIG. 1, the upper end flange 40 of the convergent spool 22 is coupled to the lower end flange 42 of the gasification chamber spool. A lower end flange 82 of the convergent spool is coupled to an upper end flange 86 of the HEX quench spool 26. The convergent spool 22 is tapered from the upper end flange 40 to the lower end flange 82 to accelerate and concentrate the hot product received from the gasification chamber spool 18. For example, the hot product is accelerated from approximately 25 ft/sec to approximately 125 ft/sec and the mass flux of the hot product is increased by a factor of five before the hot product is discharged into the HEX quench spool 26. In a preferred embodiment, the convergent spool has a length Z between approximately 8 feet and 16 feet, e.g. approximately 12 feet. Preferably, the convergent spool 22 includes a liner 44, preferably a regeneratively cooled CMC liner, essentially the same as the gasification chamber spool liner 46 or 66 described above, only adapted to fit within the tapered geometry of the convergent spool 22. As described above with respect to FIGS. 3 and 4, the CMC liner 46 of convergent spool is designed to freeze a protective layer of solid slag onto its interior surface for high velocity erosion protection. Any solid slag removed from the interior surface due to erosion is rapidly replenished by fresh molten slag that subsequently freezes where the old solid slag was removed.

Figure 6:
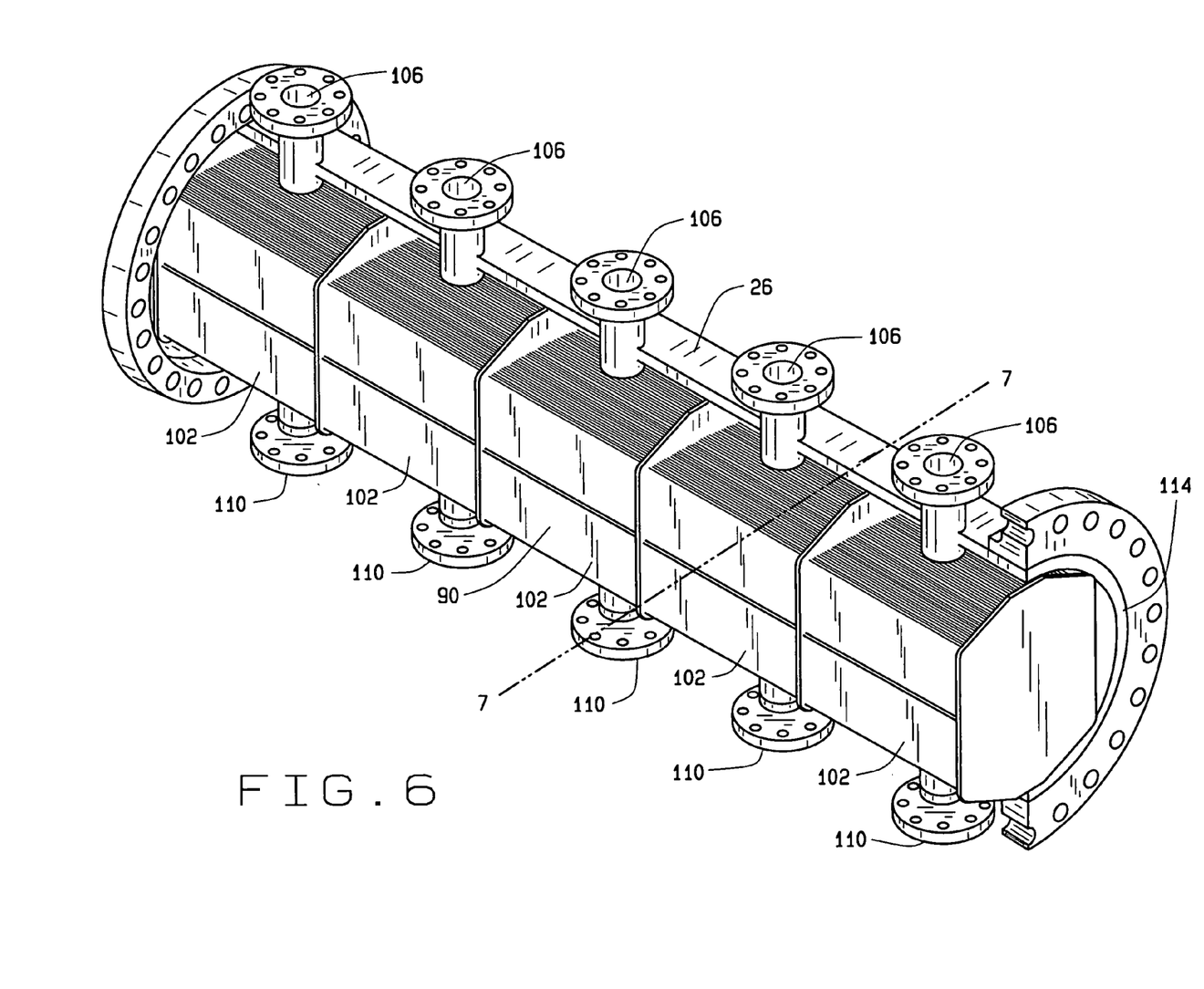
FIG. 6 is a cut-away view of a heat exchanger quench spool included in the gasification system shown in FIG. 1, illustrating a parallel plate heat exchanger core, in accordance with a preferred embodiment of the present invention.
Figure 7:
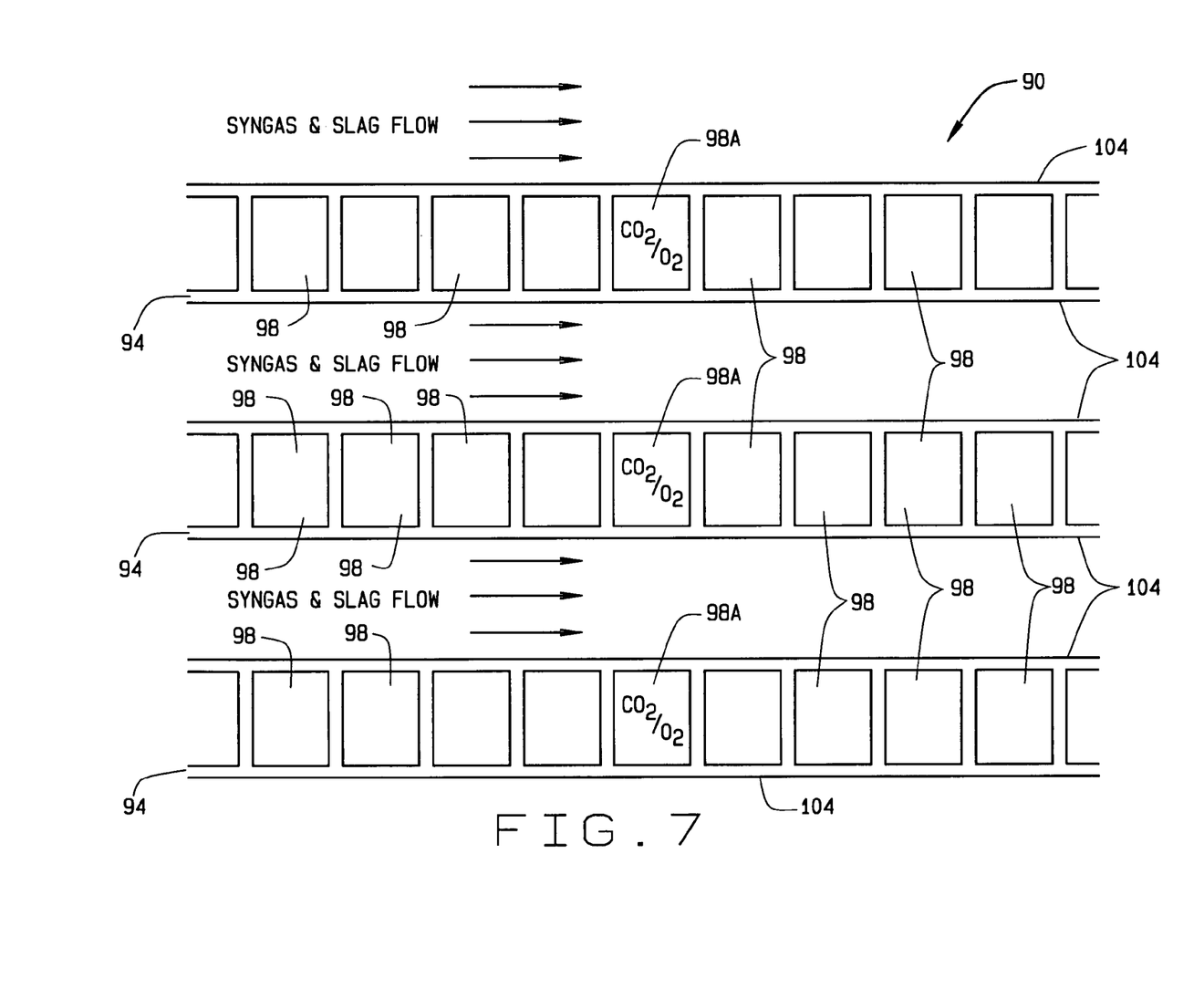
FIG. 7 is a cross-section view along line 7-7 of the heat exchanger core shown in FIG. 6.

Referring now to FIGS. 1, 6 and 7, as described above, the upper end flange 86 of the HEX quench spool 26 is coupled to the lower end flange 82 of the convergent spool 22. In one preferred embodiment, the HEX quench spool 26 includes a parallel plate heat exchanger (HEX) core 90, best shown in FIG. 6, for exchanging the sensible waste heat from the hot product with high pressure, e.g. 1,200 psia, boiler feed water and steam fluids. A cross-sectional view of this parallel plate HEX core 90, along line 7-7, is shown in FIG. 7.

Referring to FIG. 7, the HEX core 90 includes a plurality of CMC panels 94 that each includes a plurality of internal coolant channels 98. The cross-section of each coolant channel 98 can have any suitable geometric shape, e.g. square, round or triangular. The HEX core 90 employs a cross-flow geometry whereby the hot product, e.g. syngas and slag at approximately 2700° F., flows between the CMC panels 94. A coolant, for example water, flows through the coolant channels 98 to cool the hot product as it passes through the HEX core 90 along a length M of the HEX quench spool 26. Preferably, the length M will be approximately 7 feet to 20 feet, e.g. approximately 12 feet. The HEX core 90 includes a plurality of sections 102. Each section 102 has a coolant inlet 106 and a coolant outlet 110 such that each section is supplied with the coolant. Therefore, the temperature of the hot product is progressively reduced as the hot product passes between the CMC panels 94 of each subsequent section 102. As exemplarily illustrated in the table of FIG. 2, approximately 100° F. water is supplied to the inlet 106 of the downstream HEX core section 102, e.g. the inlet 106 nearest the HEX quench spool lower end flange 122, at about 50.4 lbm/sec and 1000 psia. The coolant flowing through at least one of the upstream HEX core sections 102, e.g. the section(s) 102 closest to the HEX quench spool upper end flange 86, will be heated to approximately 1200° F. superheated steam by the hot product flowing between the CMC panel 94. The superheated steam exits the HEX core section(s) 102 via the respective outlet(s) 110 at about 36.5 lbm/sec and 1200 psia. The coolant flowing through the remaining HEX core sections 102 will be heated to approximately 700° F. saturated steam that exits each respective outlet 110 at about 13.9 lbm/sec and 1200 psia. Preferably, the CMC panels 94 are generally flat in shape to minimize high speed pressure drops within the hot product stream and reduce erosion of the CMC panels 94.

In one embodiment, the superheated steam exiting the upstream HEX core section(s) 102 is supplied to a steam turbine power generator. Additionally, a portion of the saturated steam flow exiting each HEX cores 102 is delivered to the injector spool 14 and utilized as steam impinged on the dry slurry injected into the gasification chamber spool, as described above. Another portion of the saturated steam is delivered to gasification chamber spool 18 and utilized to cool the liner 46 of the gasification chamber spool 18, as described above. Similarly, another portion of the saturated steam from the HEX quench spool 26 can be supplied to the convergent spool 22 to cool the liner of the convergent spool 22, as described above.

Generally, over a large portion of the length M of HEX quench spool 26, the temperature of the hot product has been reduced to below the liquidation temperature of the slag, i.e. below approximately 2,000° F. Therefore, there is no molten slag available to form a solidified slag protective layer on at least a portion of exterior surfaces 104 of the CMC panels 94, as described above in reference to the liner 46 or 66 of the gasification chamber spool 18. More particularly, slag in the hot product entering the HEX quench spool 26 is in a molten state at a temperature of approximately 2600° F. As the hot product flows through parallel plate core 94 of the HEX quench spool 26 the temperature of hot product, including the molten slag, is progressively reduced to a temperature at which the molten slag will solidify. The temperature of syngas and solidified slag exiting the HEX quench spool will be approximately 1000° F. Due to the compact size of the gasification system 10, the hot product must flow through the HEX quench spool 26 at a high speed, e.g. approximately 150 ft/sec. The solidified slag moving through the HEX quench spool at such high speeds would be erosive and abrasive to HEX core 94 and a CMC liner 114 (shown in FIG. 6) of the HEX quench spool 26.

In one embodiment, to form such a solidified slag protective layer on the CMC panels 94 and liner 114 of the HEX quench spool core 90, various coolant channels 98 within each CMC panel 94, indicated in FIG. 7 as $CO_2/O_2$ channels 98A, are designed to flow a mixture of carbon dioxide ($CO_2$) and oxygen ($O_2$). The $CO_2/O_2$ channels 98A are placed at strategic locations along the length of each CMC panel 94 panels where solid slag is expected to flow. Additionally, the $CO_2/O_2$ channels 98A are located just upstream, i.e. nearer the HEX quench spool upper flange 86, of a location within the HEX quench spool 26 where liquefied slag exiting the convergent spool 22 transitions to solidified slag.

Figure 8:
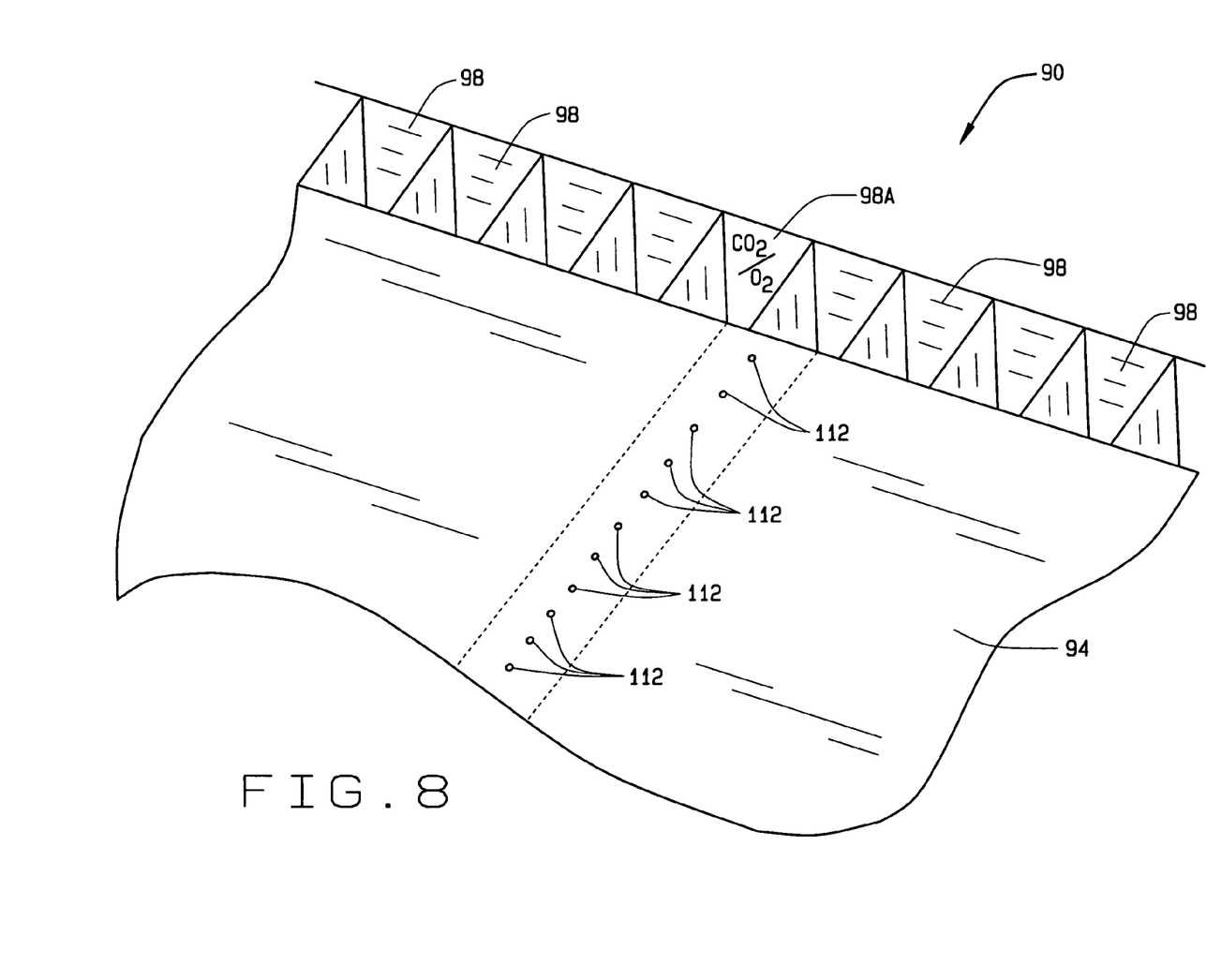
FIG. 8 is a sectional view or a portion of one of a plurality of CMC panels included in the heat exchanger core shown in FIG. 7.

Referring now to FIGS. 7 and 8, generally, during operation of the gasifier system 10, the $CO_2/O_2$ channels 98A contain only carbon dioxide ($CO_2$) gas which flows through orifices 112 included in a wall of the CMC panel 94 separating the hot product from the $CO_2$. The pressure in the $CO_2/O_2$ channels 98A is maintained so that the $CO_2$ flow is operated as a trickle purge to prevent plugging of the orifices 112. At periodic intervals, oxygen ($O_2$) gas will also be directed to individual $CO_2/O_2$ channels 98A for injection into the hot product cross-flow. The $O_2$ injected into the hot product cross-flow will rapidly burn with the product syngas to raise the temperature of the syngas and solidified slag in the hot product to well above the slag's liquidation temperature, e.g. above 2200° F. Thus, the solidified slag is returned back to the liquid state and will subsequently adhere to and coat the HEX core CMC panels 94 and the CMC liner 114, thereby providing a solidified slag protective layer on each of the CMC panels 94 and the CMC liner 114. Each $CO_2/O_2$ channel 98A is individually programmed to flow oxygen to create and replenish the solidified slag protective layer with minimal impact on the production of syngas.

Alternatively, the solidified slag layer on the CMC panels 94 of the core 90 and the CMC liner 114 of the HEX quench spool 26, the coolant, e.g. $H_2O$, flowing through the coolant channels 98 can be turned off for short periods of time. Turning off the flow of coolant will allow the hot product to flow through the HEX quench spool 26 and approximately the same temperature as the hot products exits the convergent spool 22, e.g. approximately 2600° F. Therefore, the slag in the hot product will remain in the molten state and will adhere and coat the CMC HEX core panels 94 and the CMC liner 114. The flow of the coolant through the coolant channels 98 can then be periodically turned off for a short period to re-coat or replenish the solidified slag protective layer on the CMC HEX core panels 94 and the CMC liner 114.

Referring again to FIG. 1, in one preferred embodiment, the gasifier system 10 includes the deluge quench spool 30. An upper end flange 118 of the deluge quench spool 30 is coupled to a lower end flange 122 of the HEX quench spool 26. As the solidified slag and syngas exit the HEX quench spool 26 and flow through the deluge quench spool 30, the deluge quench spool 30 sprays substantial amounts of recycled sour water into the solidified slag and syngas to scrub all solid particles, e.g. fly ash particles, from the stream. Spray droplet diameters are designed to be relatively large for good solid particle impact and subsequent downstream separation in a conventional cyclone separator, not shown.

The gasification system 10 is a compact gasification system that utilizes dry slurry to produce synthesis gas at a CGE of greater than approximately 80%, e.g. 83% or more. Particularly, the synthesis gas produced by the gasification system 10 has greater than 80%, e.g. 83% or more, of the chemical energy of the carbonaceous material, e.g. coal or petcoke, utilized to form the dry slurry injected into the gasification chamber spool 18.

Additionally, the HEX quench spool 26 of the gasification system 10 that will recover a large portion of the sensible heat lost during the production of the resulting syngas. That is, for example, the gasification system 10 has greater than 83% CGE, therefore, approximately 17% of the chemical energy of the carbonaceous material is potentially lost. However, as described above, the gasification system 10 will recover the sensible heat as high pressure superheated steam and saturated steam in the HEX core sections 102. The recovered superheated steam is supplied to a steam turbine power generator; a portion of the saturated steam is delivered to the injector spool 14 and utilized as steam impinged on the dry slurry injected into the gasification chamber spool; another portion of the saturated steam is delivered to gasification chamber spool 18 and utilized to cool the liner 46 or 66 of the gasification chamber spool 18; and yet another portion of the saturated steam from the HEX quench spool 26 is supplied to the convergent spool 22 to cool the liner of the convergent spool 22. Thus, in a preferred embodiment, the gasification system 10 recovers greater than 75% of the sensible heat. For example 90% of the sensible heat is recovered by the gasification system 10.

Furthermore, the gasification system 10 is compact such that an internal volume of the gasification system 10 is approximately an order of magnitude, e.g. a factor of 10, lower than all known gasifier systems. Particularly, the gasification system 10 has a pipe spool configuration where the various components, e.g. the gasification chamber spool 18, the convergent spool 22, and HEX quench spool 26 can be prefabricated, shipped and then assembled on site. Therefore, capital costs, operational costs, maintenance costs associated with the gasification system 10 of the present invention are considerably lower than such costs for known gasification systems. Further yet, the implementation of CMC structures in the various components of the gasification system 10, i.e. the liners in the gasification chamber spool 18 and the convergent spool 22, and the liner and core panels of HEX quench spool 26 will significantly increase the life of each such structure and therefore, significantly increase the life of the gasification system 10 with respect to known gasification systems. For example, it is envisioned the CMC liners and HEX core panels that grow, or build-up, the solidified slag protective layers will have a life of approximately between 3 and 10 years, thereby significantly increasing the life of the gasification system 10 and significantly reducing maintenance costs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A system for converting a carbonaceous material into a gaseous product, said system comprising:

a gasification chamber spool including a ceramic matrix composite (CMC) liner adapted to form a solidified slag protective layer on an interior surface of the liner from molten slag flowing through the gasification chamber spool;

an injector spool adapted to inject a dry slurry stream into the gasification chamber spool and impinge at least one reactant on the dry slurry stream to generate a chemical reaction that produces a gaseous product and the molten slag; and a heat exchanger (HEX) quench spool adapted to receive hot product produced by the gasification chamber spool, the HEX quench spool including a CMC liner adapted to form a solidified slag protective layer on an interior surface of the liner from molten slag flowing through the HEX quench spool and a plurality of CMC panels having a plurality of internal coolant channels, each of the plurality of CMC panels including orifices extending through the CMC panel and fluidly connecting at least one of the plurality of internal coolant channels with an interior volume of the HEX quench spool that receives the hot product produced by the gasification chamber spool.

2. The system of claim 1, wherein the gasification chamber spool has a length between approximately 10 feet and 20 feet, and an inside diameter of between approximately 35 inches and 45 inches.

3. The system of claim 1, wherein the gasification chamber spool further includes a secondary liner having a plurality of coolant channels adapted to flow a coolant therethrough to maintain the gasification chamber spool CMC liner at a temperature sufficient to form the solidified slag protective layer thereon.

4. The system of claim 1, wherein the system produces the gaseous product having at least 83% of the chemical energy of the dry slurry injected into the gasification chamber spool.

5. The system of claim 1, wherein the system further comprises a convergent spool coupled to the gasification chamber spool adapted to increase a flow velocity and mass flux of the hot product prior to the hot product entering the HEX quench spool and including a CMC liner adapted to form a solidified slag protective layer on an interior surface of the liner from molten slag flowing through the convergent spool.

6. The system of claim 5, wherein the convergent spool has a length between approximately 8 feet and 16 feet.

7. The system of claim 1, wherein the at least one of the plurality of internal coolant channels that is fluidly connected with the orifices is an oxygen supply providing oxygen gas through the orifices to the interior volume of the HEX quench spool.

8. The system of claim 1, wherein each of the plurality of CMC panels includes opposed side walls and common separator walls extending between the opposed side walls, and the orifices extend through the opposed side walls.

9. The system of claim 1, wherein each of the plurality of CMC panels includes opposed side walls and common separator walls extending between the opposed side walls such that an outer side of each opposed side wall is oriented toward the interior volume of the HEX quench spool that receives the hot product and an inner side of each opposed side wall is oriented toward the plurality of internal coolant channels, each of the common separator walls being exposed on one side to one of the plurality of internal coolant channels and exposed on an opposite side to another of the plurality of internal coolant channels, and the orifices extend through the opposed side walls.

10. A compact, highly efficient gasifier system for converting a carbonaceous material into a gaseous product, said system comprising:
   a gasification chamber spool including a ceramic matrix composite (CMC) liner adapted to form a solidified slag protective layer on an interior surface of the liner from molten slag flowing through the gasification chamber spool;
   an injector spool adapted to inject a dry slurry stream into the gasification chamber spool and impinge at least one reactant on the dry slurry stream to generate a chemical reaction that produces a gaseous product and the molten slag;
   a convergent spool coupled to the gasification chamber spool and including a CMC liner adapted to form a solidified slag protective layer on an interior surface of the liner from molten slag flowing through the convergent spool; and
   a heat exchanger (HEX) quench spool coupled to the convergent spool, the HEX quench spool including:
      a CMC liner adapted to form a solidified slag protective layer on an interior surface of the liner from molten slag flowing through the HEX quench spool; and
      a parallel plate HEX core comprising a plurality of CMC panels each including a plurality of internal coolant channels, and each of the plurality of CMC panels including orifices extending through the CMC panel and fluidly connecting at least one of the plurality of internal coolant channels with an interior volume of the HEX quench spool that receives a hot product produced by the gasification chamber spool.

11. The system of claim 10, wherein the gasification chamber spool further includes a secondary liner having a plurality of coolant channels adapted to flow a coolant therethrough to maintain the gasification chamber spool CMC liner at a temperature sufficient to form the solidified slag protective layer thereon.

12. The system of claim 10, wherein the coolant flowing through the internal coolant channels of each HEX core CMC panel is water and to exchange the sensible waste heat the HEX quench spool is adapted to produce superheated steam from the water flowing through the internal coolant channels that is usable for exporting to the injector spool.

13. The system of claim 10, wherein the system produces the gaseous product having at least 83% of the chemical energy of the dry slurry injected into the gasification chamber spool.

14. The system of claim 10, wherein the gasification chamber spool has a length between approximately 10 feet and 20 feet, and an inside diameter of between approximately 35 inches and 45 inches and the convergent spool has a length between approximately 8 feet and 16 feet.

15. The system of claim 10, wherein the plurality of CMC panels are spaced apart and oriented parallel to each other.

16. The system of claim 15, wherein the plurality of CMC panels are located within an interior volume of the HEX quench spool.

17. The system of claim 10, wherein the plurality of CMC panels includes orifices fluidly connecting at least one of the plurality of internal coolant channels with an interior volume of the HEX quench spool that receives a hot product produced by the gasification chamber spool.

18. The system of claim 10, wherein each of the plurality of CMC panels includes opposed side walls and common separator walls extending between the opposed side walls, each of the common separator walls being exposed on one side to one of the plurality of internal coolant channels and exposed on an opposite side to another of the plurality of internal coolant channels.

19. The system of claim 10, wherein the plurality of CMC panels include orifices extending there through that fluidly connect at least one of the plurality of internal coolant channels with an interior volume of the HEX quench spool that receives the hot product produced by the gasification chamber spool, each of the plurality of CMC panels including opposed side walls and common separator walls extending between the opposed side walls, and the orifices extend through the opposed side walls.

* * * * *